Jan. 24, 1956
P. R. VAN SITTERT
2,732,050
TORQUE RELEASE CLUTCH
Filed Sept. 21, 1951
4 Sheets-Sheet 1
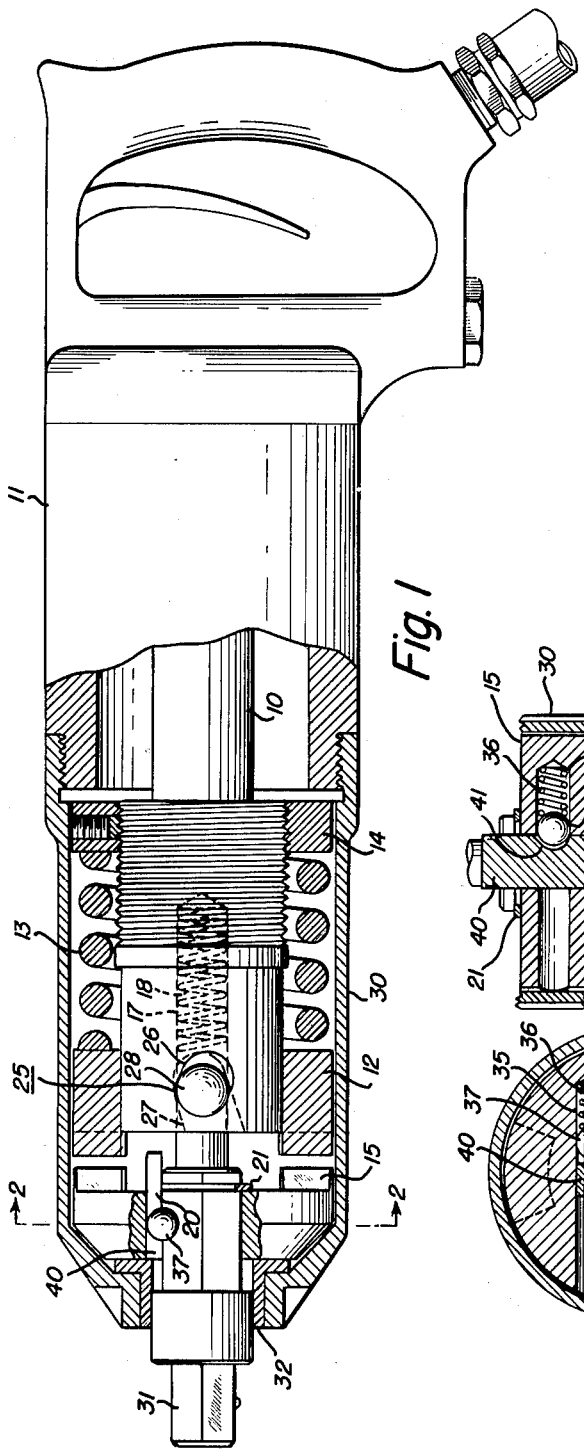
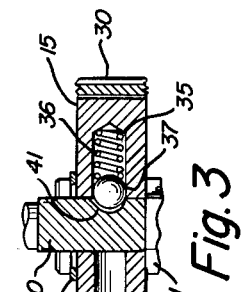
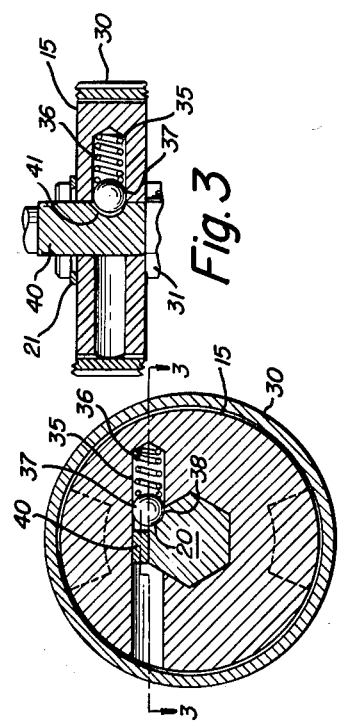
INVENTOR.
PAUL R. VAN SITTERT
BY Woodling and Krost
attys

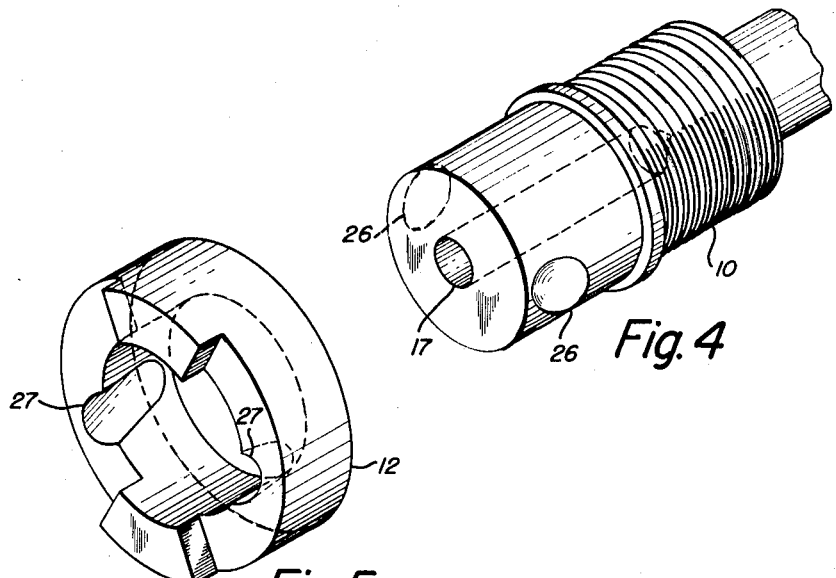
Fig. 4
Fig. 5
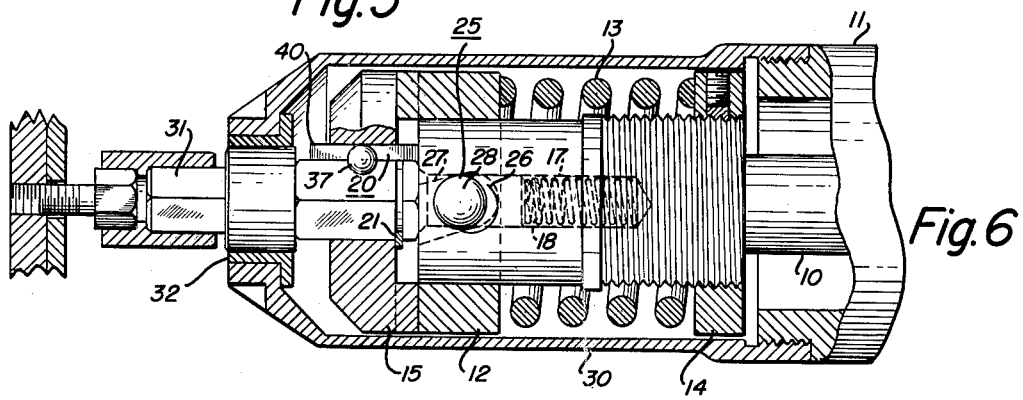
Fig. 6
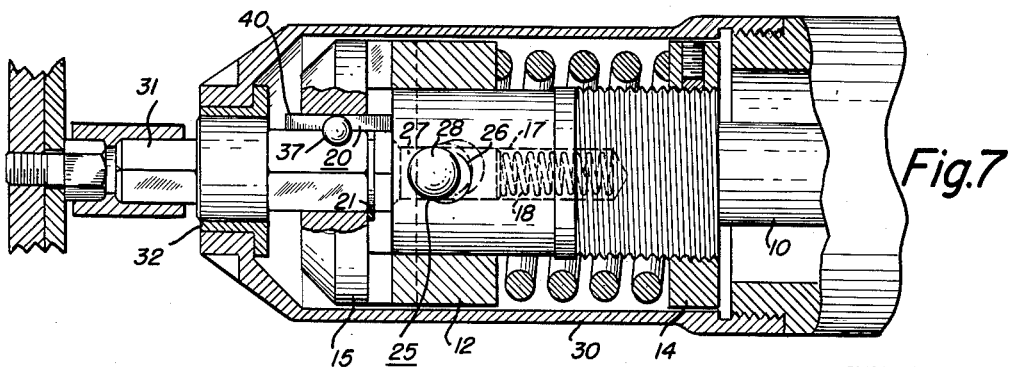
Fig. 7

Jan. 24, 1956  P. R. VAN SITTERT  2,732,050
TORQUE RELEASE CLUTCH

Filed Sept. 21, 1951  4 Sheets-Sheet 3

INVENTOR.
PAUL R. VAN SITTERT

BY Woodling and Krost
attys

INVENTOR.
PAUL R. VAN SITTERT

United States Patent Office 2,732,050
Patented Jan. 24, 1956

2,732,050

TORQUE RELEASE CLUTCH

Paul R. Van Sittert, Cleveland, Ohio, assignor to The Rotor Tool Company, a corporation of Ohio Application September 21, 1951, Serial No. 247,675

16 Claims. (Cl. 192—56)

This invention relates generally to power wrenches for driving such objects as bolts, nuts, and screws and relates more specifically to such a wrench wherein the driving action is discontinued by self-action upon tightening of the driven object to a predetermined torque.

An object of the invention is to provide a drive release construction for a power wrench, which drive release construction is self-acting at a selected predetermined driving torque.

Another object of the invention is to provide such a self-acting release construction with a resetting feature which operates by longitudinal shifting of parts as the wrench is forced against the work.

Other objects and a fuller understanding of the invention may be had by referring to the following description and claims, taken in conjunction with the accompanying drawing, in which:

Figure 1 is a longitudinal section through a wrench which embodies one preferred form of the basic invention, the parts being shown in the rest condition;

Figure 2 is a sectional view taken along line 2—2 of Figure 1;

Figure 3 is a sectional view taken along line 3—3 of Figure 2, the view being restricted to the area of interest;

Figure 4 is a detail view of the main drive shaft;

Figure 5 is a detail view of the drive jaw clutch shown separate from the structure to better illustrate details of construction thereof;

Figure 6 is a section as Figure 1, with the parts thereof in driving condition;

Figure 7 is the same section with the parts thereof at the instant of torque release;

Figure 8:
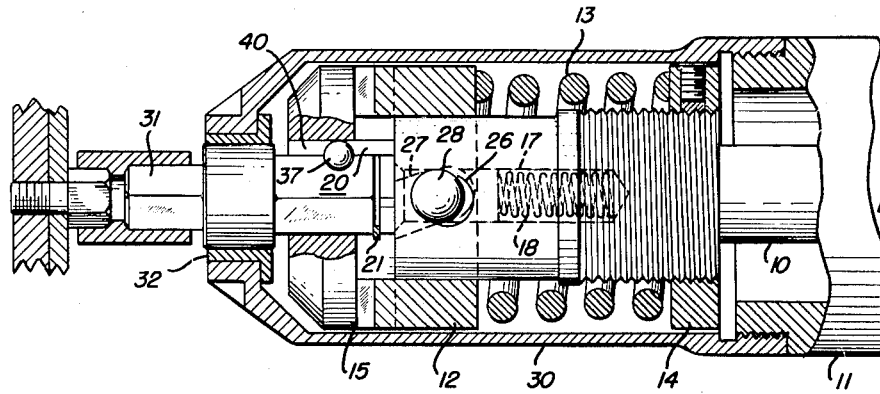
Figure 8 is the same section with the parts thereof self-activated to the release condition, but with the work shaft still engaged with the driven workpiece.

For the past many years there has been considerable effort placed on providing impact wrenches and torque wrenches of various kinds for driving or loosening bolts, nuts, screws, and the like. The usual torque wrench consisted simply of a driving motor with an overload release clutch between that motor and a driven shaft, whereby the wrench would cease to drive after reaching a predetermined degree of tightness.

On the other hand, emphasis has been placed on impact type of driving wrenches in order to produce an extreme tightening effect with very little torque reaction to the operator and, also, with a minimum amount of weight.

The present invention, although useful in conjunction with a torque multiplier device for producing a severe tightening effect with a minimum amount torque reaction and weight, is directed principally to a novel construction which will provide release of the driving effect upon the production of a predetermined amount of driving torque, in order that the driven member will be fully tightened, but cannot be overtightened.

One embodiment of this improved device, very briefly stated, comprises a drive shaft 10 with a driven clutch member 12 thereon. The clutch member 12 is nonrotatively mounted on the shaft 10 to a certain extent, but actually, is keyed to the shaft 10 by a ball screw arrangement 25 and, thereby, will rotate a slight amount with respect to the drive shaft 10, and in so doing, will retract longitudinally with respect to the drive shaft 10.

A driven shaft 31 is mounted in telescopic relationship to the shaft 10, and is urged to an extended position by a spring 18. The shaft 31, therefore, may be rotated and longitudinally reciprocated independently from the shaft 10. A driven jaw clutch 15 is carried on the longitudinally shiftable driven shaft 31. The jaw clutch 15 is non-rotative with respect to shaft 31, but is longitudinally shiftable thereon. A lock device 20 is provided to hold the shaft 31 and jaw clutch 15 in specific longitudinal relationship to prevent premature shifting thereof. Basically speaking, however, the jaw clutch 15 is free to reciprocate longitudinally upon the driven shaft 31, independently of the movement of the shaft, although it is carried longitudinally with the shaft 31 when that shaft reciprocates longtiudinally. Therefore, when the drive clutch 12 and the jaw clutch 15 are in engagement, the lock 20 is released, and there will be a driving force transferred from the shaft 10 to the shaft 31. This may be referred to as the drive condition. Upon reaching a certain magnitude of torque, the ball screw 25 will pull the drive clutch 12 against the urge of the spring 13 away from the jaw clutch 15 and interrupt the driving connection. Upon such disconnection, a spring 13, mounted to urge the drive clutch 12 longitudinally forward, will push the clutch 12 downwardly against the face of the teeth on jaw clutch 15 and will move the jaw clutch 15 along the shaft 31 out of range of further interconnection between the teeth on drive clutch 12 and the teeth on the jaw clutch 15. This may be referred to as the release condition.

Upon withdrawal of the tool from the work, the driven shaft 31 is free to extend through the jaw clutch 15 and out of the tool housing. Such action re-engages the lock 20. Thereafter, when the tool is again pressed against the work, the shaft 31 will be pushed back toward the jaw clutch 12 and the jaw clutch 15 will be carried along and moved back again into position to be engaged by the teeth on the drive clutch 12.

It is to be understood that the foregoing description is a very brief summary of the basic concept of the present invention, and a detailed description of the construction and operation follows hereafter.

Although not forming an integral part of the present invention, a motor 11 is illustrated within a suitable housing and pistol grip mechanism in the Figure 1 of the drawing. The motor is adapted to drive the shaft 10. As previously stated, this motor may be a direct drive, but preferably some suitable type of torque multiplier should be incorporated, as will be understood by those experienced in the art of impact tool construction. A separate detail view of the drive shaft 10 is illustrated in Figure 4 of the drawings, in order that ball races 26 on the surface thereof may be better shown. The shaft 10 has an axial bore 17 therein. The driven shaft 31 extends into the bore 17 and thereby constitutes an extendable and retractable longitudinal extension of the drive shaft 10, but with no direct driving interconnection therebetween. In other words, the shaft 10 and the shaft 31 are axially coextensive over a portion of their distance and are relatively telescopic in nature. A spring 18 within the bore 17 urges the shaft 31 to a longitudinally extended position with respect to the drive shaft 10.

The shafts 10 and 31 are operative within a housing 30. The shaft 10 is carried by the driving mechanism, whereas a bearing 32 at the opposite end of the housing 30 rotatively supports the driven shaft 31. A spring retainer collar 14 is mounted around the drive shaft 10 and serves to confine the spring 13 to any desired degree of compression to thereby resist the longitudinal movement of the jaw clutch 12 by screw action of the ball screw 25. Therefore, adjustment of the collar 14 will predetermine the torque at which the jaw clutch 12 will separate from the jaw clutch 15. The spring 13 encompasses the shaft 10 and presses against the drive clutch 12, and thereby urges the drive clutch 12 longitudinally toward the end of the shaft 10.

The drive clutch 12, as best illustrated in Figure 5 of the drawings, has two ball race slots 27 therein which are adapted to cooperate with the ball races 26 on the surface of the shaft 10. Balls 28 are confined in the resultant two chambers formed by the cooperating ball races 26 and 27 between the shaft 10 and the drive clutch 12. In the construction illustrated herein, a very short longitudinal travel is required for the drive clutch 12. One size tool has teeth on the drive clutch 12 which are $3/16$ of an inch long, and accordingly, the travel of the drive clutch 12 must be about $3/16$ of an inch, or slightly more, in order to provide full clearance and release. Operation and construction of such ball screws as the ball screw 25 is well understood by engineers, and therefore, need not be explained in great detail, other than to say that the cooperating ball races 26 and 27 form two very short segments of a helical portion of a screw thread, with the ball 28 taking the place of a projecting thread which would be carried permanently by one member of a screw and thread arrangement. It is, therefore, sufficient to say that whenever there is sufficient torque produced between the drive shaft 10 and the drive clutch 12 to overcome the longitudinal force of the spring 13, then the drive clutch 12 can rotate slightly with respect to the drive shaft 10 and the ball screw 25 will retract the drive clutch 12 upon the drive shaft 10. As before stated, the length of the ball races 26 and 27 may be quite short, because the distance which the ball 28 travels is only half as much as the distance which the drive clutch 12 needs to be retracted. In the foregoing example wherein the teeth of the drive clutch are $3/16$ of an inch, the elongation of the raceways need be only $3/32$ of an inch.

The jaw clutch 15 and the driven shaft 31 are non-rotative, but longitudinally reciprocable with respect to one another. As illustrated best in Figure 2 of the drawing, this is accomplished by providing a hexagonal collar area on the driven shaft 31, and a mating opening through the jaw clutch 15.

Longitudinal movement of the jaw clutch 15 is limited in the direction of the drive clutch 12 by a spring collar 21.

There is illustrated a lock member 20 operating between the jaw clutch 15 and the driven shaft 31. The construction of the lock 20 is best illustrated in Figures 2 and 3 of the drawings. However, before proceeding further to discuss the construction and operation of the lock 20, the operation of the entire tool, ignoring the lock 20, will be explained and illustrated in the drawings, whereafter the function of the lock 20 will be better understood.

In Figure 1 of the drawings, the tool is illustrated in its rest condition with the shaft 31 fully extended. The jaw clutch 15 is moved to the end of the housing 30, as far as possible. The drive clutch 12 is in its most forward position under the urge of the spring 13. In operation, the jaw clutch 15 and the drive clutch 12 are operable through a work cycle with the driven member 31 in said extended position as shown in Figure 1 being the rest condition of said cycle. The cycle includes a drive condition, as shown in Figure 6 and a release condition as shown in Figure 8.

To place the tool in operation, the end of the driven shaft 31 is equipped with a socket or screwdriver bit, according to the type of work to be performed. The entire tool is then placed against the workpiece and pressed against that workpiece to force the shaft 31 against the urge of spring 18 and retract the shaft 31 back into the housing 30. Retraction movement of the shaft 31 into the housing 30 will move the jaw clutch 15 toward the drive clutch 12. The teeth on the drive clutch 12 and the jaw clutch 15 overlap in the same rotative path and the drive shaft 10 will thereby transmit driving force through the ball screw 25 to the drive clutch 12, and the drive clutch 12 will, in turn, engage the teeth of the jaw clutch 15 and rotate both the clutch 15 and the driven shaft 31.

The tool is theoretically operable without the lock 20, but in practical operation, the lock becomes quite necessary. In the discussion of the operation of this tool, the condition was set forth that the teeth on clutches 12 and 15 would overlap in the same rotative path. This assumption could be wrong, whereupon as the tool is placed against the workpiece, the faces of the teeth on the clutches 12 and 15 come in contact and simply move the jaw clutch 15 away from the drive clutch 12 without ever coming into engagement. The lock 20 overcomes this possibility.

The lock 20, as illustrated in Figures 2 and 3, is very simple in construction and operation. A lateral bore 35 is drilled across the jaw clutch 15. A spring 36 and a ball 37 are placed in the bottom end of the bore 35. A small notch 38 is cut into the surface of the driven shaft 31 at the proper longitudinal position where the jaw clutch 15 should be located. Thus, the spring and ball 36 and 37 will lock the jaw clutch 15 in a longitudinally stationary position with respect to the driven shaft 31. Accordingly, when the shaft 31 and the jaw clutch 15 are locked together longitudinally, as well as rotatively, and the tool placed against the workpiece, then the jaw clutch 15 cannot be moved out of reach of the drive clutch 12 and, eventually, the drive clutch 12 will rotate to a position where the teeth thereon will fall between the teeth of the jaw clutch 15 and engage the jaw clutch 15 in a rotative, driving condition.

A key 40, as best illustrated in Figure 3, has a small notch 41 therein which permits the ball 37 to seat into the notch 38 without interference. The key 40 fits along the side of the shaft 31 within a suitable keyway in the jaw clutch 15. The key 40 is longitudinally reciprocable along the surface of the shaft 31, its length from the notch 41 to its top end is such that said top end will not contact the end surface of shaft 10 unless the teeth of clutches 12 and 15 are overlapped and rotatable in the same path. In other words, key 40 cannot be actuated to release lock 20 unless the clutch is in operative position. The side walls of notch 41 form a cam which is sufficient to drive the ball 37 against the urge of the spring 36 and thus disengage the ball 37 from the notch 38. Upon such disengagement, the jaw clutch 15 is again free to reciprocate longitudinally along the shaft 31.

Accordingly, whenever the drive clutch 12 finally assumes a position to allow the teeth thereof to drop between the teeth on the jaw clutch 15, the surface of the drive shaft 10 will push the end of the key 40 as the two clutch members move together, and therefore the action of the clutches coming together causes an unlatching of the jaw clutch 15 for longitudinal reciprocation upon the shaft 31. Of course, as long as there is no force pushing the clutch 15 longitudinally, it will remain fixed and engaged with the clutch 12, although free to move.

After engagement of the clutches, rotation of the driven shaft 31 will continue until the resistance to rotation is sufficient to transmit a resistance torque through the teeth of the mated jaw clutches 15 and 12, and consequently, to the ball screw 25, to cause the screw 25 to move the drive clutch 12 longitudinally against the urge of the spring 13. Eventually, the ball screw 25 will, in this manner, retract the drive clutch 12 away from the jaw clutch 15 to such an extent that the teeth of the two clutches will skip past one another without transmitting driving force therebetween. This condition is illustrated in Figure 7 of the drawings. There is no tendency of the resulting drive torque to part the clutches 12 and 15 by cam action therebetween, because the faces of the teeth are not tapered, and accordingly, do not form a camming action. Rather, the friction between the teeth on the two clutch members will tend to drag the jaw clutch 15 along with the drive clutch 12 as the drive clutch is retracted, and were the jaw clutch 15 not restrained by spring collar 21 against following the full distance after the drive clutch 12, separation would never be accomplished.

Upon reaching the rearward position illustrated in Figure 7, the drive clutch 12 will jump up on top of the teeth on jaw clutch 15 and release the torque acting upon the ball screw 25. Accordingly, the spring 13 is immediately active to press the drive clutch 12 longitudinally toward the end of the drive shaft 10 again. However, the teeth on the drive clutch 12 are rapidly rotating, and accordingly, have no opportunity to again engage with the teeth on the jaw clutch 15, but rather will push on the faces thereof. Such pushing on the faces of the teeth on jaw clutch 15 simply moves the unlocked jaw clutch 15 longitudinally along its supporting driven shaft 31 until the clutches 12 and 15 are moved to the position illustrated in Figure 8 of the drawings. This may be referred to as the release condition. In Figure 8, it is seen that the drive clutch 12 has extended itself as far as possible toward the end of the shaft 10, but is not in engagement with the jaw clutch 15. Further engagement is impossible.

From the foregoing description, it is clearly apparent that a predetermined degree of torque can be provided by setting the force of the spring 13, whereafter the driving interconnection between the clutches 12 and 15 will be discontinued without further possibility of a hammer action to drive the driven shaft 31 farther. Accordingly, the tool is then removed from the workpiece, and the workpiece is driven to an exact, predetermined degree of tightness which is neither too loose nor too tight.

The very act of taking the tool off of the workpiece is an important function in the construction and operation of this improved invention. When the tool is taken away from the workpiece, the spring 18 immediately extends the shaft 31 out of the housing 30 as far as possible. As the shaft 31 is thus extended, it will drag through the jaw clutch 15, because the jaw clutch 15 is restrained by the housing 30. As the tool is withdrawn from the work, and the shaft 31 extended by the spring 18, the opposite end of the key 40 will strike against the bushing 32 and will move the notch 41 back into position to receive the ball 37 and thereby allow the ball 37 to again come out into the notch 38 in the shaft 31 and longitudinally secure the jaw clutch 15 with the shaft 31. The parts now assume the rest condition. Thus, the tool is again set in such a manner that when the tool is placed against the next workpiece, the inward movement of the shaft 31 will carry the jaw clutch 15 back into engagement with the drive clutch 12. It is believed that this is the first torque release clutch which is "cocked" by removal of thrust as the tool is removed from the work, and reset upon placing the tool into engagement with a workpiece.

The embodiment of the invention thus far described employs two well defined clutch members of the familiar dogtooth type, and requires that the two shaft members be telescopic in nature with respect to one another in order that the clutch parts may be reset by longitudinal thrust of the driven shaft 31. To illustrate the fact that this invention is broad in concept, and not limited to the particular construction illustrated in the Figures 1–8, a second embodiment of the invention is set forth in the Figures 9–14.

In the first embodiment of the invention, if the telescopic shafts 10 and 31 were allowed to remain independently rotatable, but held against relative longitudinal shifting and therefore not telescopic, the clutch parts could yet be reset by longitudinal thrust of the tool upon the work by making the drive shaft 10 into a telescopic shaft and placing a spring between those telescopic parts. Then, as the tool would be placed upon the workpiece, the entire forward assembly would be retracted into the housing to allow room for the clutch 15 to move into the release condition, and as the tool would be withdrawn from the workpiece, the entire assembly would move forward, except that the jaw clutch 15 would contact the end of the housing, and accordingly, the drive clutch 12 would be brought down into engagement with the jaw clutch 15. The embodiment of Figures 9–14 further illustrates that balls, rather than teeth, are within the invention.

Figure 9:
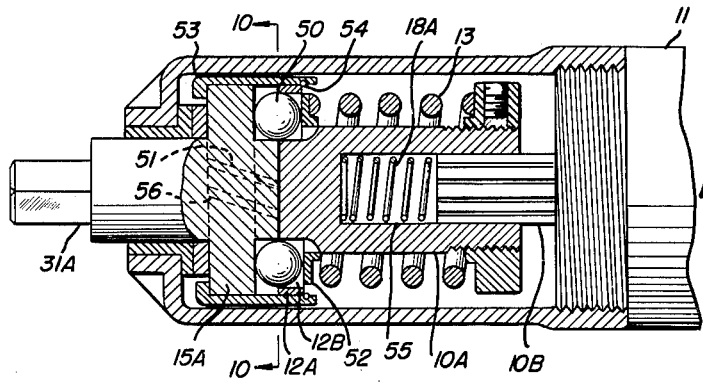
Figure 9 is a view of another embodiment of the invention, corresponding to Figure 1.
Figure 10:
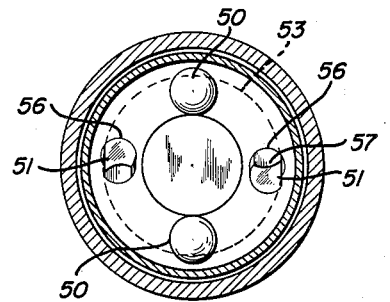
Figure 10 is a section taken along line 10—10 of Figure 9.

In Figure 9 of the drawings, the drive clutch 12, which was longitudinally reciprocable upon the drive shaft 10, has been replaced by an integral flange 12A having longitudinally extending bores 12B therethrough. Steel balls 50 are carried within the bores 12B and serve the purpose of the dogteeth on drive clutch 12A.

A drive shaft 10A has a telescopic relation to a splined drive shaft 10B. The drive shaft 10B is driven from a primary power source either from direct drive or from a torque multiplier. A spring 18A is positioned within a splined bore 55 in the shaft 10A, and tends to urge the shaft parts 10A and 10B longitudinally apart.

A spring collar 52 surrounds the shaft part 10A and is pressed against the top openings of the bores 12B by spring 13 and consequently urges the balls 50 longitudinally forward within the bores 12B.

A driven shaft 31A is mounted as a longitudinal extension of shaft 10A. The shaft 31A is independently rotatable with respect to the shaft 10A, but is held against relative longitudinal movement with respect to shaft 10A. The shaft parts 31A and 10A are held against longitudinal relative movement by a collar flange 15A, which corresponds to the jaw clutch 15 of the first embodiment, and a lock collar 53. The lock collar 53 is turned under the edge of the collar 15A, as illustrated, and extends to a position beyond the top edge of the collar 12A. A lock spring clip 54 is provided to secure the lock collar 53 to the flange 12A, thereby preventing relative longitudinal movement of the shaft 31A and 10A.

There are no dogteeth on the part 15A, as illustrated in the first embodiment of the invention, but in their stead, two keytooth members 51 are provided. These keytooth members 51 reside within longitudinal bores 56 which extend in an angular direction with respect to the axis of the shaft 31A and lie along the inner area of the member 15A.

Figure 11:
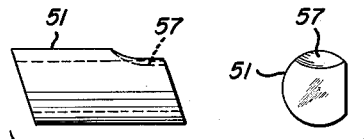
Figure 11 is a side and end view of the keytooth employed for transmitting driving torque through the clutch parts of the second embodiment of the invention.

The keys 51 are set forth in detail in the Figure 11 of the drawings. From the Figure 11, it may be seen that the keys are provided with a socket 57 at the top side thereof to receive the spherical surface of a ball 50. Therefore, as the shaft 10A is rotated, it will carry the balls 50 in a rotational path within the bores 12B and running upon the surface of the member 15A. However, when the keys 51 are in the position illustrated in Figure 9, each of the balls 50 will rotate until it contacts the socket 57 in a key 51, whereupon a driving force will be transmitted from the shaft 10A through the balls 50 to the key members 51, and subsequently to the member 15A and the driven shaft 31A. The socket 57 is cut into each of the keys 51 at the proper angle to resolve all forces imposed upon the surface of the socket in a direction which is normal to the sloping contact surface between the keys 51 and the bores 56. Consequently, there is no tendency for the torque transmitted between the bores 50 and the keys 51 to move the keys 51 longitudinally in the bores 56. However, the sockets 57 do provide a camming action which tends to move the balls 50 in a longitudinal direction against the force of the spring 13. Proper sloping of the bores 56 places the entire camming action against the spring 13, and substantially none against the keys 51.

In essence, the operation of the second embodiment follows the same basic principles employed in the first embodiment described. The first position or "rest" condition is illustrated in Figure 9 of the drawings wherein the shafts 10A and 31A are forced to their maximum longitudinal extension by the spring 18A, and consequently, the keys 51 are pushed into the bores 56 to their maximum distance by contact of the keys 51 against the bearing in the end of the housing 30. Rotational driving power through the telescopic shafts 10A and 10B will thereby deliver driving force through the balls 50, keys 51, and shaft 31A to a workpiece.

Figure 12:
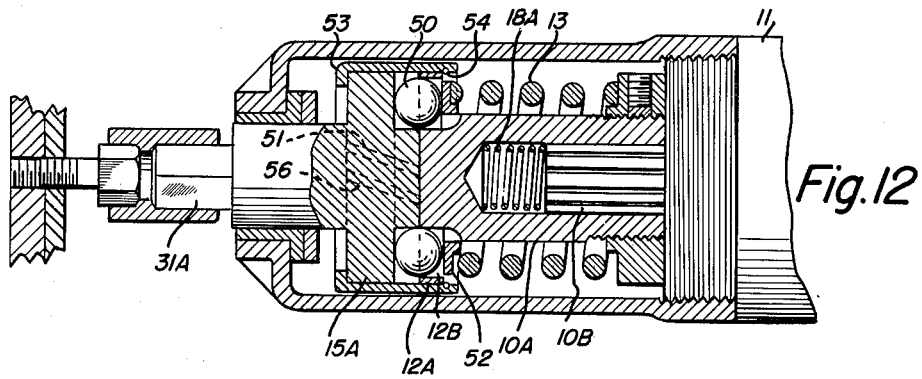
Figure 12 is a section taken as Figure 9, with the tool pressed into engagement with a workpiece, and the parts of the wrench retracted as a result thereof.

As the torque wrench is placed against the workpiece, the spring 18A is compressed, and the entire clutch mechanism is retracted within the housing. Such retraction spaces the member 15A from the surface of the bearing for the shaft 31A in the end of the housing 30. Thus, there is no specific resistance against longitudinal movement of the keys 51 out of their respective bores 56. In Figure 12, the keys 51 are illustrated out of contact with the balls 50, in order to best illustrate the sloping position of the keys 51.

Figure 13:
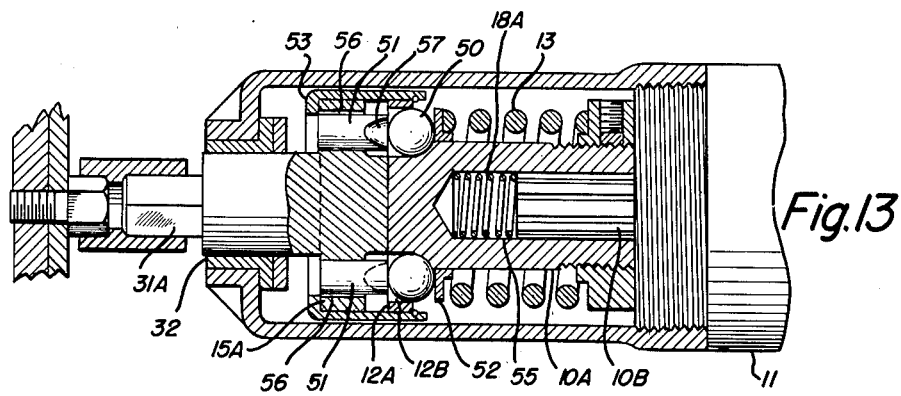
Figure 13 is a section taken at a 90° rotational position with respect to the section of Figure 9 and with the clutch parts illustrated substantially as they appear at the instant of release of the driving torque.

As the torque transmitted from the balls 50 to the keys 51 increases by reason of an increasing resistance by the workpiece, the balls are gradually cammed against the action of spring 13 by the surfaces on the sockets 57. Eventually the torque will be sufficient to bring the balls 50 to a position where they can skip over the tops of keys 51. This is the release condition, and is illustrated in Figure 13 of the drawings. Figure 13 is a section taken at right angles with respect to the sections 9 and 12, in order to illustrate the keys in a position directly below the cammed balls 50. The balls 50 appear to be perched directly on top of the keys 51 in the Figure 13.

Figure 14:
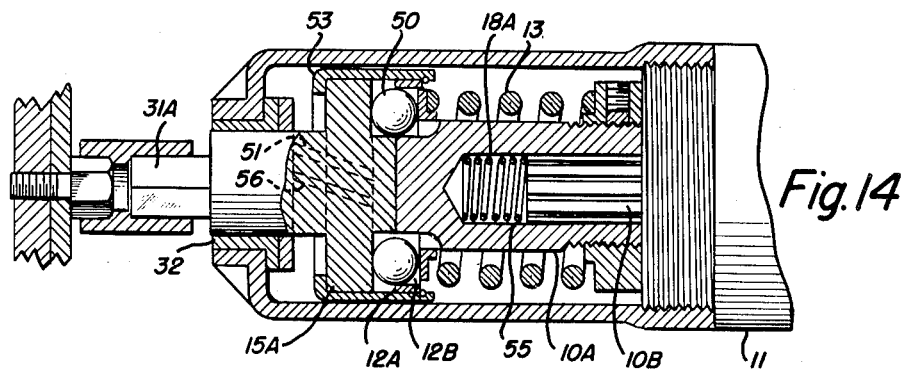
Figure 14 is the same sectional view as Figure 13, after the clutch parts have taken on a permanent separation condition.

Once having reached the cammed position illustrated in Figure 13, all torque transmission immediately ceases, and rotation of the driven shaft 31A ceases. Also, when the balls 50 reach the tops of the keys 51, the camming action which worked against the spring 13 immediately ceases, and the balls are urged in one direction only, and that is by the spring 13, therefore, immediately upon reaching the top of its respective key 51, each ball 50 will begin to force endwise upon its key 51. The force upon the end of the key 51 is no longer normal to an unyielding surface, but, rather, the force extends substantially longitudinally with the key and, therefore, the key instantly moves under the force exerted by the balls and is pushed endwise to the position illustrated in Figure 14. The figure 14 is a section taken similar to the sectional view of Figures 9 and 12 and, therefore, represents the position of the balls just after pushing their respective keys and passing a quarter turn beyond. The keys have thus been removed as an obstruction to free rotation of the balls 50 and driving torque is no longer transmitted. There is nothing to reset the keys 51 back into the rotational path of the balls 50, and consequently driving torque is permanently ended until the keys are otherwise reset.

Upon cessation of the driving force transmittal, the operator will remove the torque wrench from the workpiece. Such removal removes the compression force upon spring 18A, whereupon the driving shaft 10A and the driven shaft 31A, together with the clutch carried thereby, are extended toward the end of housing 30. Such extension forces the ends of the keys 51 against the bearing in the end of housing 30 and holds the keys 51 against longitudinal movement as the member 51A is moved down upon the keys. Thus, the keys 51 are retracted within the bores 56 and are extended back into the rotational path of the balls 50 and the wrench is reset again by the longitudinal movement of the shafts within the housing for the next work cycle period.

Although the invention has been described in two embodiments of its preferred form with a certain degree of particularity, it is understood that the present disclosure of the preferred forms has been made only by way of example and that numerous changes in the details of construction and the combination and arrangement of parts may be resorted to without departing from the spirit and the scope of the invention as hereinafter claimed.

What is claimed is:

1. A torque wrench comprising, a telescopic shaft, said shaft having a first shaft member and a second shaft member, each independently rotatable with respect to the other, said first and second shaft members having an extended position and a retracted position, means urging said first and second shaft members to the longitudinally extended position with respect to one another, drive transfer clutch means interconnecting said shaft members and having a drive transmitting condition for transmitting driving force from one said shaft member to the other, said clutch means having a release condition, said clutch means being self-acting under a predetermined torque to change from said transmitting condition to said release condition, and resettable means responsive to longitudinal shifting of said first and second shaft members from the longitudinal extended position to the longitudinal retracted position to reset said clutch to said drive transmitting condition.

2. A torque wrench comprising, rotating drive means, rotatable driven means, a torque release clutch means, said torque release clutch means having a drive interconnecting condition between said drive means and said driven means and a release condition to discontinue said drive interconnecting condition, said torque release clutch means being self-acting at a predetermined torque to release driving interconnecting between said drive and driven members and maintain the release condition, at least one of said drive and driven means being axially shiftable, and means responsive to axial shifting of said one of the drive and driven means relative to the other to reset said clutch to said drive interconnecting condition.

3. A torque wrench for turning a turnable object, a driven member for turning said object, a driving member for driving said driven member, first and second clutch means disposed between said driven member and said driving member, said first clutch means including a driven clutch part connected to rotate with said driven member, said second clutch means including a driving clutch part connected to said driving member, said driven member and said driven clutch part being longitudinally shiftable to an extended position and to a retracted position relative to said driving clutch part, said first and second clutch means being operable through a work cycle with said driven member in said extended position being a rest condition of said cycle, said cycle including a driving condition and a release condition, resilient means urging said driven member longitudinally of said driving member to said rest condition, both said driven member and said driven clutch part in said rest condition being disconnected from said driving clutch part, said resilient means resisting axial pressure exerted against said turnable object, longitudinal movement of said driving member toward said turnable object with said driven member engaging said turnable object overcoming the force of said resilient means and longitudinally shifting said driven member to said retracted position and thereby establishing said driving condition between said driven and driving members, said second clutch means including cam means tending to disengage said second clutch means from said driven member, force means urging said second clutch means towards an engaged position, said cam and force means being responsive to torque transmitted from said driving member to said driven member to disengage said second clutch means and thereby establish said release condition between said driven and driving members with said driven member still pressed to said retracted position under axial pressure exerted against said turnable object, means in response to disengagement of said second clutch means to provide a continuous release condition between said driven and driving members, removal of said driven member away from said turnable object and release of said axial pressure causing the resilient means to shift said driven member to said extended position and thereby restore said driven member to said rest condition with said driven clutch part disconnected from said driving clutch part.

4. A torque wrench comprising a housing, first and second axially aligned members rotatable in said housing, means for providing relative longitudinal movement between said members of a given amount, a clutch member interfitting with said second member for rotation therewith, said clutch member and said first member having clutch engageable surfaces, means to provide relative longitudinal movement between said clutch member and said first member of an amount less than said given amount, and a detent between said first member and said clutch member whereby upon relative extensible movements of said first and second members said clutch member is positioned at one limit of its movement to engage said detent and upon subsequent relative retractable movements of said first and second members, said clutch engageable surfaces are brought into engagement.

5. A torque wrench comprising, a telescopic shaft, said shaft having a drive shaft member and a driven shaft member, said drive shaft member having a longitudinal axial bore therein, said driven shaft member extending into said bore, resilient means urging said driven shaft member out of said bore, a drive jaw collar having an axial opening therethrough, said drive shaft member extending through said axial opening and carrying the drive jaw collar thereon, screw surface interconnection means between said drive jaw collar and said drive shaft member providing longitudinal retraction of said drive jaw collar away from said driven shaft upon relative rotation in a given direction between said drive jaw collar and the said drive shaft member, resilient means urging said drive jaw collar toward said driven shaft member, a driven jaw collar having an axial opening therethrough, said driven shaft member extending through said axial opening and carrying the driven jaw collar thereon, said driven shaft member and the opening through the driven jaw collar interfitting to provide longitudinal shiftability and non-rotative mounting of the driven jaw collar on the driven shaft member when said collars are disengaged, detent means limiting the extent of longitudinal shifting of said driven jaw collar with the driven shaft to a distance less than the maximum extension of the driven shaft as the driven shaft is extended by the resilient means, said drive jaw collar and driven jaw collar having mutually cooperating drive transfer surfaces engageable upon longitudinal shifting together, and disengageable upon longitudinal shifting apart.

6. A torque wrench comprising, a telescopic shaft, said shaft having a drive shaft member and a driven shaft member, said drive shaft member having a longitudinal axial bore therein, said driven shaft extending into said bore, resilient means urging said driven shaft out of said bore, a drive jaw collar having an axial opening therethrough, said drive shaft member extending through said axial opening and carrying the drive jaw collar thereon, screw surface interconnection means between said drive jaw collar and said drive shaft member providing longitudinal retraction of said drive jaw collar away from said driven shaft upon relative rotation in a given direction between said drive jaw collar and said drive shaft member, resilient means urging said drive jaw collar toward said driven shaft member, a driven jaw collar having an axial opening therethrough, said driven shaft member extending through said axial opening and carrying the driven jaw collar thereon, said driven shaft member and the opening through the driven jaw collar interfitting to provide longitudinal shiftability and non-rotative mounting of the driven jaw collar on the driven shaft member, means limiting the extent of longitudinal shifting of said drive jaw collar with the driven shaft member to a distance less than the maximum extension of the driven shaft member as the driven shaft member is extended by the resilient means, said drive jaw collar and driven jaw collar having mutually cooperating drive transfer surfaces engageable upon longitudinal shifting together, and disengageable upon longitudinal shifting apart, lock means having a lock condition holding said driven jaw collar longitudinally fixed on said driven shaft, and lock release means operable responsively to the engagement movement of the drive jaw collar and driven jaw collar into drive transfer relationship.

7. A torque wrench comprising, a telescopic shaft, said shaft having a drive shaft member and a driven shaft member, said drive shaft member having a longitudinal axial bore therein, said driven shaft member extending into said bore, resilient means urging said driven shaft member out of said bore, a drive jaw collar having an axial opening therethrough, said drive shaft member extending through said axial opening and carrying the drive jaw collar thereon, screw surface interconnection means between said drive jaw collar and said drive shaft member providing longitudinal retraction of said drive jaw collar away from said driven shaft upon relative rotation in a given direction between said drive jaw collar and the said drive shaft member, resilient means urging said drive jaw collar toward said drive shaft member, a driven jaw collar having an axial opening therethrough, said driven shaft member extending through said axial opening and carrying the driven jaw collar thereon, said driven shaft member and the opening through the driven jaw collar interfitting to provide longitudinal shiftability and non-rotative mounting of the driven jaw collar on the driven shaft member, means limiting the extent of longitudinal shifting of said driven jaw collar with the driven shaft to a distance less than the maximum extension of the driven shaft as the driven shaft is extended by the resilient means, said drive jaw collar and driven jaw collar having mutually cooperating drive transfer surfaces engageable upon longitudinal shifting together, and disengageable upon longitudinal shifting apart, said driven jaw collar having a laterally extending lock bore opening through the side wall of the collar which defines the axial opening therethrough, a lock element in said bore, resilient means urging said lock slug out of said bore, a notch in said driven shaft to receive said lock element to effect longitudinal locking of said driven shaft member and driven jaw collar, a lock key extending longitudinally along said driven shaft between said driven shaft and the jaw collar thereon, said key having a cam surface thereon, said key mounted longitudinally reciprocally with the cam surface thereon aligned to contact said lock element and move the slug into said lock bore to release the driven jaw collar relative to said driven shaft member, and means operating said key to unlock the driven jaw collar upon full engagement of the drive jaw collar with the driven jaw collar.

8. A torque wrench for turning a turnable object, a housing, a driven member in said housing for turning said object, a driving member for driving said driven member, first and second clutch means disposed between said driven member and said driving member, said first clutch means including a driven clutch part connected to rotate with said driven member, said second clutch means including a driving clutch part connected to said driving member, said driven member and said driven clutch part being longitudinally shiftable to an extended position and to a retracted position relative to both said housing and said driving clutch part, said first and second clutch means being operable through a work cycle with said driven member in said extended position being a rest condition of said cycle, said cycle including a driving condition and a release condition, resilient means urging said driven member longitudinally of said housing to said rest condition, both said driven member and said driven clutch part in said rest condition being disconnected from said driving clutch part, said resilient means resisting axial pressure exerted against said turnable object, longitudinal movement of said housing toward said turnable object with said driven member engaging said turnable object overcoming the force of said resilient means and longitudinally shifting said driven member to said retracted position and thereby establishing said driving condition between said driven and driving members, said second clutch means including cam means tending to disengage said second clutch means from said driven member, force means urging said second clutch means towards an engaged position, said cam and force means being responsive to torque transmitted from said driving member to said driven member to disengage said second clutch means and thereby establish said release condition between said driven and driving members with said driven member still pressed to said retracted position under axial pressure exerted against said turnable object, means in response to disengagement of said second clutch means to provide a continuous release condition between said driven and driving members, removal of said housing away from said turnable object and release of said axial pressure causing the resilient means to shift said driven member to said extended position and thereby restore said driven member to said rest condition with said driven clutch part disconnected from said driving clutch part.

9. A torque release clutch comprising, a drive shaft, a first clutch part carried in drive transmitting relationship by said drive shaft, a driven shaft, a second clutch part carried in drive transmitting relationship by said driven shaft, said first and second clutch parts each having a rest condition, a drive transmission position and a release condition, said clutch parts being characterized by their construction precluding a camming reaction therebetween which would tend to cause said clutch parts to move to said release condition, one said clutch part having a cam interconnection with the shaft by which it is carried, said cam interconnection providing a limited rotational and longitudinal movement between the clutch part and shaft under a predetermined degree of torque to withdraw the said clutch part out of said drive transmission condition, resilient means urging said one clutch part into said drive transmission condition, means initiated by the movement of said one clutch part to move the other clutch part to its release condition, and manual means to move said other clutch part from said rest condition to said drive transmission condition.

10. A torque limiting clutch comprising, mating first and second clutch parts, said first and second clutch parts each mounted for reciprocable movement between a drive engagement position and a release position, means responsive to torque transfer between said clutch parts to move said first clutch part away from the said second clutch part to said release position, resilient means urging said first clutch part back to said drive engagement position, said first clutch part thereby returning to the drive engagement position after separation of the clutch parts and the consequent removal of the torque, said second clutch part being characterized by a lack of specific resistance to movement thereof to the release position from the drive engagement position after drive engagement with the first clutch part has been interrupted, whereby return of the first clutch part toward the second clutch part in returning to the drive engagement position will cause the second clutch part to move away from the drive engagement position by contact thereof with the advancing first clutch part.

11. A torque release clutch comprising, a drive shaft, first clutch means carried in drive transmitting relationship by said drive shaft, a driven shaft longitudinally movable relative to said drive shaft, second clutch means carried in drive transmitting relationship by said driven shaft, said first and second clutch means having a rest condition, a drive transmission conditon and a release condition, cam means operable by driving torque transmitted through said first and second clutch means for temporarily moving one of said clutch means out of contact of the other and temporarily setting said clutch means in said release condition, means initiated upon said movement of said one clutch means to move the other clutch means to said release condition to thereby prevent further driving engagement, and manual means to move said other clutch means from said rest condition into said drive transmission condition.

12. A torque tool comprising a housing, a work engaging assembly rotatably and reciprocably mounted therein and including a drive shaft with first clutch means carried in drive transmitting relationship thereto, a driven shaft with second clutch means carried in drive transmitting relationship thereto, said first and second clutch means having a drive connecting transmission position and a release position, means operable by driving torque transmitted through said first and second clutch means for temporarily moving one of said clutch means from said drive transmission position and for moving said clutch means to a release position, and interacting means mounted with said clutch means to poise the latter for said drive transmission and release positions, said interacting means being operated to and from a ready-to-drive transmission position by relative movement of said housing and work engaging assembly.

13. A torque tool comprising a work engaging assembly rotatably and reciprocably mounted and including a pair of relatively longitudinally movable drive and driven members, each of said members including a shaft portion and a clutch element, said clutch elements having interengaging and disengaging positions, said work engaging assembly having torque release means for causing said elements to assume disengaging position, said assembly including resettable means to poise one of said clutch elements in position for interengaging position and which is released by relative movement of such clutch elements to poise such elements for disengaging position, and said drive and driven members being longitudinally relatively movable to move said resettable means from said disengagement position to a position ready for clutch interengaging position.

14. A torque tool comprising a housing, a work engaging assembly rotatably and reciprocably mounted therein and including a pair of relatively longitudinally movable drive and driven members, each of said members including a shaft portion and a clutch element, said clutch elements having interengaging and disengaging positions, said work engaging assembly having torque release means for causing said elements to assume disengaging position, said assembly including resettable means engageable with said housing to poise one of said clutch elements in position for interengaging position and which is released by relative movement of said clutch elements to poise said elements for disengaging position, and said housing being movable relative to said work engaging assembly to move said resettable means from said disengaging position to a position ready for clutch interengaging position.

15. A torque tool comprising a housing, a work engaging assembly rotatably and reciprocably mounted therein and including a pair of relatively longitudinally movable drive and driven members, each of said members including a shaft portion and a clutch element movably mounted relative to its shaft portion, said clutch elements having interengaging and disengaging positions, said work engaging assembly having torque release means for causing said elements to assume disengaging position, one of said clutch elements having detent means to releasably retain it against movement relative to its shaft while said element is moved to interengaging position and which is released when said element attains said interengaging position, and said housing being movable relative to said work engaging assembly to reset said detent means into latching position on said shaft and to poise said elements for said interengaging position.

16. A torque tool comprising a housing, a work engaging assembly rotatably and reciprocably mounted therein and including a pair of relatively longitudinally movable drive and driven members, each of said members including a shaft portion and a clutch element, said elements having interengaging and disengaging positions, said work engaging assembly having torque release means for causing said elements to assume disengaging position, said assembly including a resettable member slidably mounted to one of said clutch elements and engageable with said housing to poise said one clutch element for interengaging position and which is engageable with the other of said clutch elements to poise said element for disengaging position, and said housing being movable relative to said work engaging assembly to move said resettable member from said disengaging position to a position ready for said clutch interengaging position.

References Cited in the file of this patent

UNITED STATES PATENTS

| | | |
|---|---|---|
| 998,615 | Huneke | July 25, 1911 |
| 2,160,622 | Olson et al. | May 30, 1939 |